United States Patent Office 3,350,832
Patented Nov. 7, 1967

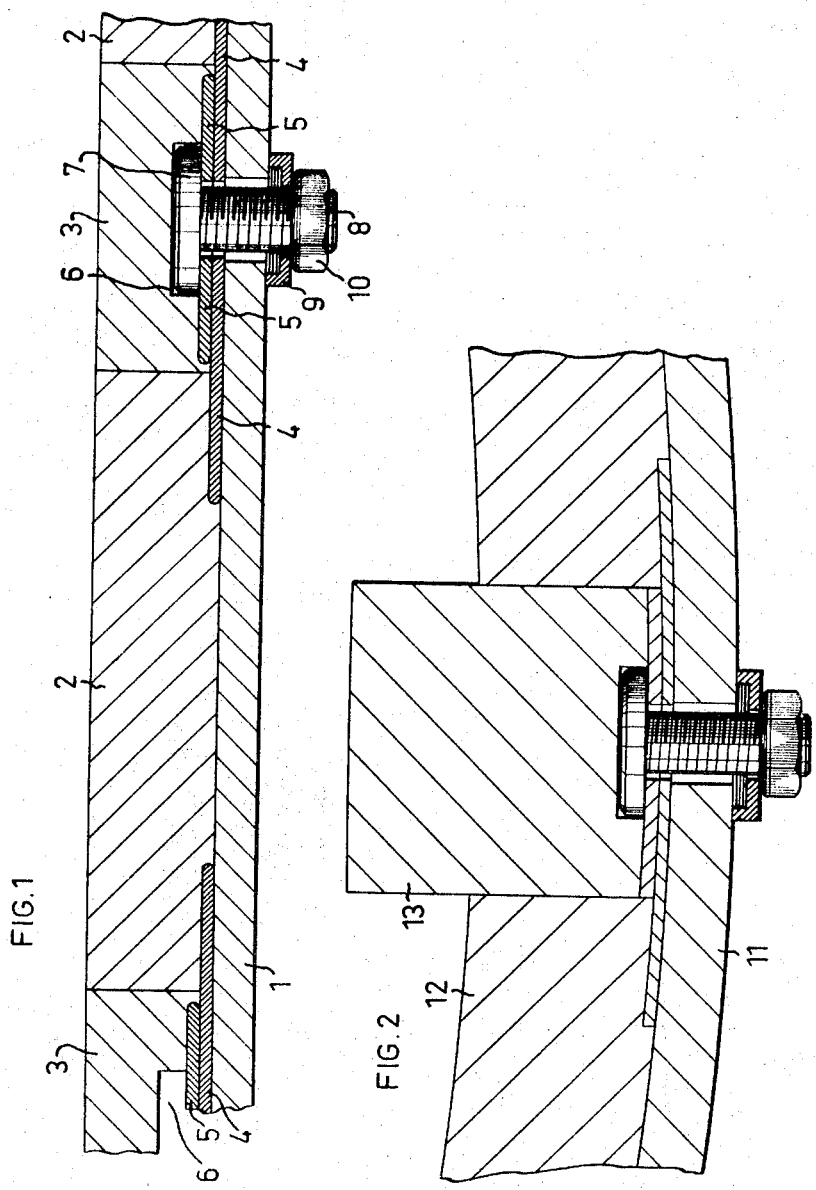

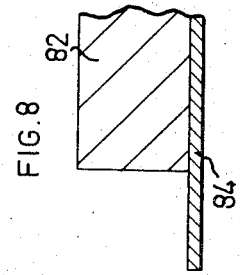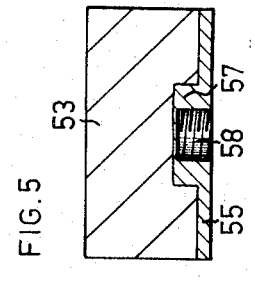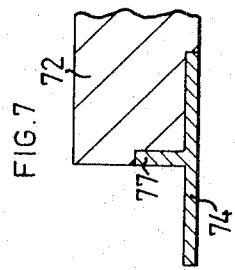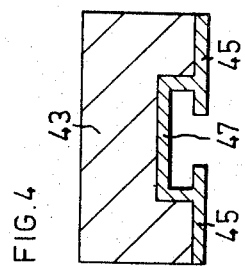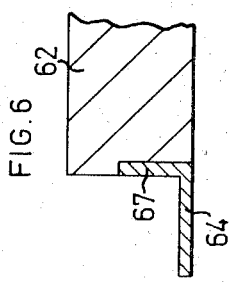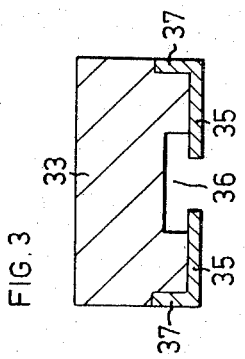

3,350,832
WALLS EXPOSED TO WEAR
Bo Klas Gerhard Persson, Trelleborg, Sweden, assignor to Trelleborgs Gummifabriks Aktiebolag, Trelleborg, Sweden
Filed Aug. 27, 1965, Ser. No. 483,042
Claims priority, application Sweden, Nov. 5, 1964, 13,338/64
2 Claims. (Cl. 52—622)

ABSTRACT OF THE DISCLOSURE

A lining for a wall exposed to wear, comprising interspaced panels and strips of elastomeric wear-resistant material. Metal abutments are anchored on the strips and overlie metal flanges, anchored to and protruding from the panels along the walls. Clamping means engage the wall and the abutment for clamping the metal flanges between the wall and the abutments.

---

This invention relates to a lining for a wall which is exposed to wear. The lining is of the type comprising a wear-resistant elastomer layer and clamping means retaining the layer to the wall.

Linings of this type are employed for example on the shell walls of ball or tube mills, on the bottoms and side walls of cargo spaces in vehicles, in conveyor chutes, measuring receptacles etc. In the prior art embodiments of such linings the clamping means engage and clamp the elastomer layer to the wall. This implies several disadvantages. In mounting the elastomer layer, and particularly in use, said layer risks to be crushed or torn to pieces, and attention is also called to the fact that a pre-stressed and deformed elastomer is rapidly exhausted and worn out.

The object of the present invention is to eliminate these disadvantages of prior art linings by constructing the lining so that the elastomer layer anchored to the wall is not subjected to compression by the clamping means and so that in spite of the elastomer layer being subdivided into panels and strips there is no possibility for particles contacting the exposed front surface of the lining and penetrating between the panels and strips to enter between the wall and the back surface of the lining, where the particles would rapidly damage the lining during use.

A further object is to provide panels of elastomeric wear-resistant material extending in spaced relationship in parallel along the wall, metal plate means anchored to said panels and protruding from each of said panels along and in contact with the wall towards each of two adjacent ones of said panels, strips of elastomeric wear-resistant material, each of said strips extending between two adjacent ones of said panels, metal abutment means anchored to said strips and overlying and contacting said metal plate means, and clamping means engaging the wall and said abutment means for clamping said metal plate means between the wall and said abutment means.

These and further features of the invention and the advantages gained thereby will become apparent from the following description, reference being made to the accompanying drawings illustrating some embodiments of the invention. In the drawings:

FIG. 1 shows a section of a portion of a wall made in accordance with the invention;

FIG. 2 shows a section of a modified form of the arrangement in FIG. 1;

FIGS. 3–8 show sections of further embodiments of elastomer layer portions and metal plates anchored thereto.

A wall 1 provided with a lining having a plane surface is shown in FIG. 1. A wall of this type is suited to serve for example as the bottom or side wall of a conveyor chute, measuring receptacle or cargo space in means of conveyance. The lining comprises an elastomer layer and fastening means therefor. The material of the elastomer layer may suitably be wear-resistant rubber. The elastomer layer is composed of alternately plate-shaped members 2 and strip-shaped members 3. On the side of the plates 2 facing the wall 1 are glued or preferably vulcanized two metal plates 4 adjacent two opposite lateral edges of the plates 2, said metal plates 4 extending in the manner of flanges from said lateral edges along the wall 1. Glued or vulcanized to the side of the strips 3 facing the wall are two metal plates 5 which extend in the manner of flanges over the mouths of recesses 6 provided in the strips and having the mouths facing the wall. The heads 7 of clamping means in the form of bolts 8 are disposed in said recesses 6. The shafts of said bolts 8 extend between the metal plates 5, and those portions of the metal plates 4 which are situated between the plates 5 and the wall 1 and extend in the manner of flanges from the plates 2, said bolt shafts projecting through holes in the wall 1. Spacing washers 9 and nuts 10 are mounted on the bolt shaft end projecting from the wall 1, and when tightened the nuts 10 cause the bolt heads 7 to clamp the metal platees 4 and 5 against the wall 1. When so clamping the metal plates 4 and 5 the bolt heads 7 directly engage the metal plates 5 which are pressed directly against the metal plates 4 which in turn are pressed directly against the wall 1, i.e. the clamping is performed without subjecting the elastomer material of the plates 2 and the strips 3 to any clamping action whatever by said clamping means. The parts employed in this arrangement are so dimensioned that the plates 2 and the strips 3 are in abutting relationship and display a smooth continuous elastomer layer surface.

FIG. 2 shows an arrangement exactly corresponding to that of FIG. 1 except that the strips 13 have a larger dimension at right angles to the wall 11 than do the plates 12. This embodiment is suited for ball and tube mills and the wall 11 with the associated lining is therefore shown as being cylindrically curved in FIG. 2. The strips 13 projecting from the plates 12 into the interior of the cylinder serve as lifting means. Should metal lifting means be desired between elastomer plates the strips 13 may be made entirely from metal.

FIGS. 3–8 show modified forms of the metal plates employed to fasten the elastomer layer sections together. In FIG. 3 there is thus shown on elastomer strip 33 having a recess 36 for clamping means. Each of the metal plates 35 projecting in the manner of a flange over the mouth of the recess 36 has a flange 37 which extends in an upward direction along one lateral edge of the strip 33. This flange 37 will improve the anchoring of the metal plate 35 to the strip 33. In FIG. 4 an elastomer strip 43 has a recess and two metal plates 45 situated on either side of said recess and projecting in the manner of flanges over the mouth of said recess, and the metal plates 45 are interconnected by means of an element 47 which is integral with the plates and extends along the walls of the recess. FIG. 5 shows an elastomer strip 53 having one side provided with a metal plate 55 including a thickened portion 57 which penetrates into a recess of the elastomer body and has a threaded hole 58 in which a fixation screw is to engage. FIG. 6 shows a marginal portion of an elastomer strip 62 provided with a metal plate 64 which extends in coplanar relation with one face of the elastomer plate 62 and has a fixation flange 67 which extends along, and is fastened to, an edge surface of the plate 62. FIG. 7 shows a marginal portion of an elastomer plate 72 provided with a metal plate 74 which is anchored to and coplanar with one face of the plate 72 and projects in the manner of a flange from one side edge of the plate 72. In addition, the metal plate 74 has a flange 77 which extends along, and is anchored to, the edge surface of the plate 72. FIG. 8 shows part of an elastomer plate 82 one entire face of which is covered by a metal plate 84 which is anchored to the elastomer plate 82 and projects in the manner of a flange from opposite side edges of the elastomer plate 82.

In all the embodiments shown in the accompanying drawings the metal plates are anchored to the elastomer members by gluing or preferably by vulcanization.

What I claim and desire to secure by Letters Patent is:

1. A lining for a wall exposed to wear, comprising panels of elastomeric wear-resistant material extending in spaced relationship in parallel along the wall, metal plate means anchored to said panels and protruding from each of said panels along and in contact with the wall towards each of two adjacent ones of said panels, strips of elastomeric wear-resistant material, each of said strips extending between two adjacent ones of said panels, metal abutment means anchored to said strips and overlying and contacting said metal plate means, and clamping means engaging the wall and said abutment means for clamping said metal plate means between the wall and said abutment means.

2. A wall which is exposed to wear having a lining comprising a wear-resistant elastomer layer, clamping means retaining said layer to the wall comprising a plurality of metal plates anchored to said elastomer layer, said elastomer layer comprising alternately plate-shaped and strip-shaped members, said metal plates being anchored to said plate-shaped members and projecting as flanges from opposite side edges of said plate-shaped members along said wall, said strip shaped members having recesses with their mouths facing the wall and a plurality of metal plates anchored to those sides of the strip-shaped members which are facing said wall projecting as flanges over the mouths of said recesses, and said clamping means engaging said metal plates to press said plates against the wall.

References Cited
UNITED STATES PATENTS

| | | | |
|---|---|---|---|
| 615,449 | 12/1898 | Hagerty | 52—461 |
| 1,419,395 | 6/1922 | MacKenzie | 52—511 |
| 1,561,762 | 11/1925 | Allen | 52—462 X |
| 2,460,052 | 1/1949 | Werner | 52—249 X |
| 2,651,391 | 9/1953 | Havens | 52—461 X |
| 2,842,073 | 7/1958 | Huston et al. | 52—463 X |
| 2,855,871 | 10/1958 | Huntington | 52—462 X |
| 2,942,701 | 6/1960 | Pope | 52—622 |
| 3,124,212 | 3/1964 | Stephens | 52—622 X |
| 3,134,846 | 5/1964 | Eastcott | 52—309 X |
| 3,226,899 | 1/1966 | Blickle | 52—622 X |

DAVID J. WILLIAMOWSKY, *Primary Examiner.*

DENNIS L. TAYLOR, *Examiner.*